United States Patent [19]
Hausmann et al.

[11] Patent Number: 4,854,258
[45] Date of Patent: Aug. 8, 1989

[54] BUMPER RUB STRIP ASSEMBLY

[75] Inventors: George J. Hausmann, St. Marys, Ohio; Donald E. Patton, Jr., Pleasant Hill, Calif.

[73] Assignee: The Goodyear Tire & Rubber Company, Akron, Ohio

[21] Appl. No.: 707,369

[22] Filed: Mar. 1, 1985

[51] Int. Cl.$^4$ ............................................. B63B 59/02
[52] U.S. Cl. .................................. 114/219; 114/220; 405/212
[58] Field of Search ................ 114/219, 220; 405/212, 405/215; 267/140

[56] References Cited

U.S. PATENT DOCUMENTS

| | | | |
|---|---|---|---|
| 3,381,484 | 5/1968 | Laughlin | 114/219 X |
| 3,918,384 | 11/1975 | Blöse | 114/219 |
| 4,548,150 | 10/1985 | Drewett | 114/219 |

FOREIGN PATENT DOCUMENTS

| | | | |
|---|---|---|---|
| 3224123 | 12/1983 | Fed. Rep. of Germany | 495/212 |
| 3242511 | 5/1984 | Fed. Rep. of Germany | 114/219 |

OTHER PUBLICATIONS

*Modern Plastics Encyclopedia,* vol. 59, No. 10A, Oct. 1982, pp. 79–80.
*The Plastic Manual,* 3rd Edition, ©1966, Ed.: A. E. Lever, p. 56.

*Primary Examiner*—Joseph F. Peters, Jr.
*Assistant Examiner*—Paul E. Salmon
*Attorney, Agent, or Firm*—J. D. Wolfe; Marc R. Dion, Sr.

[57] ABSTRACT

A bumper assembly to protect a marine or related dock from vessels or vehicles composed of a bumper strip of ultra-high molecular weight preferably 3.5 to 6 million molecular weight polyethylene covering a mass of rubber attached to the dock wall.

5 Claims, 2 Drawing Sheets

BUMPER RUB STRIP ASSEMBLY

TECHNICAL FIELD

This invention relates to a bumper rub strip assembly to protect vessels going through a canal lock, related narrow way or a dock. More particularly, this invention relates to a marine bumper rub strip assembly having a ultra-high molecular weight polyethylene rub strip assembled in operatively relationship to a mass of rubber to permit the vessel or vehicle to slide along the relative long strip and thereby dissipate the impact forces impacted to the dock or a wall.

BACKGROUND

Boats, ships and related vessels have to be aligned with the lock of a canal to pass through the lock. Usually, a concrete wing, wall or related structure of 1000 to 2000 feet is constructed at the entrance to the lock as a means to align the vessel with the lock. The pilot of the vessel points the vessel against this wing and allows it to slide along the wing until it enters into the lock. Hence, the vessel becomes aligned with the lock by sliding along the wing.

Since the vessel generates immense forces upon contact with wing or wall, it is customary to supply a bumper either on the vessel or on the wing or wall. Timber has been used as the rub strip bumper in most instances as it offered good slip properties, but unfortunately timber does not readily absorb or dissipate the impact force of the vessel contacting the wing or wall. Therefore, these forces are transmitted back into the lock or into the hull of the ship and could possibly result in damage to either or both. Also, the timber disintegrates under these forces and has to be replaced rather frequently.

DISCUSSION OF THE INVENTION AND ITS BEST MODE

We have developed a rubber and ultra-high molecular weight polyethylene fender assembly that will absorb energy and has a low coefficient of friction facing which allows a ship to slide along the approach wall or wing easier and has good service life.

The nature of our fender assembly and its advantages are apparent from the drawings wherein FIG. 1 is a partial plan view of the assembly;

Figure 1:
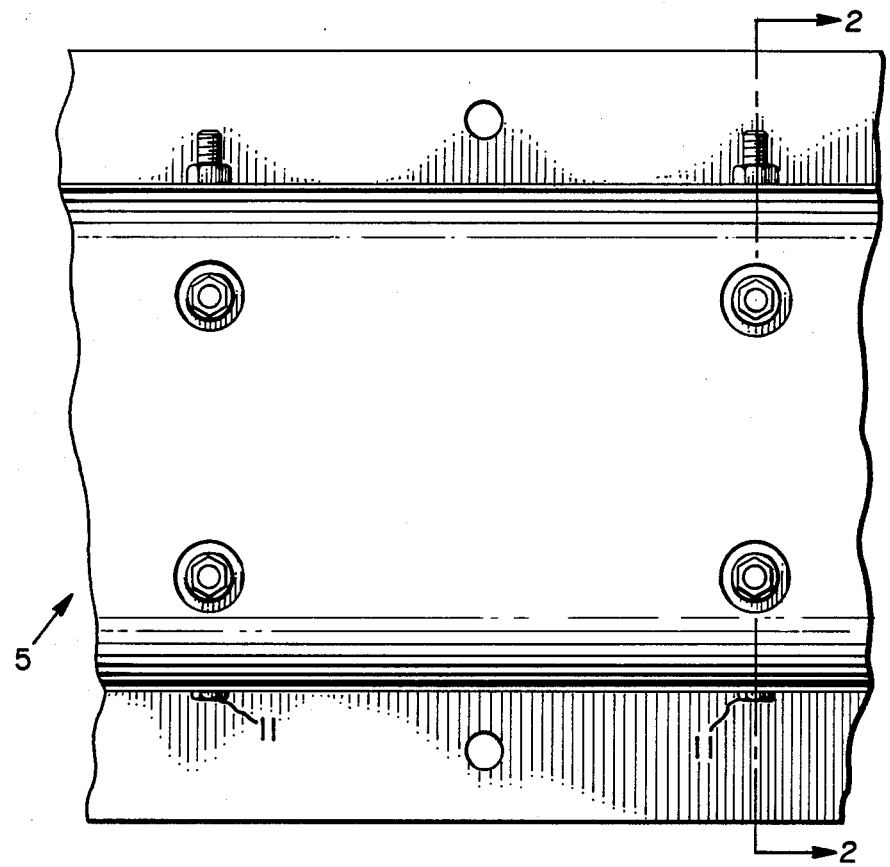
Figure 2:
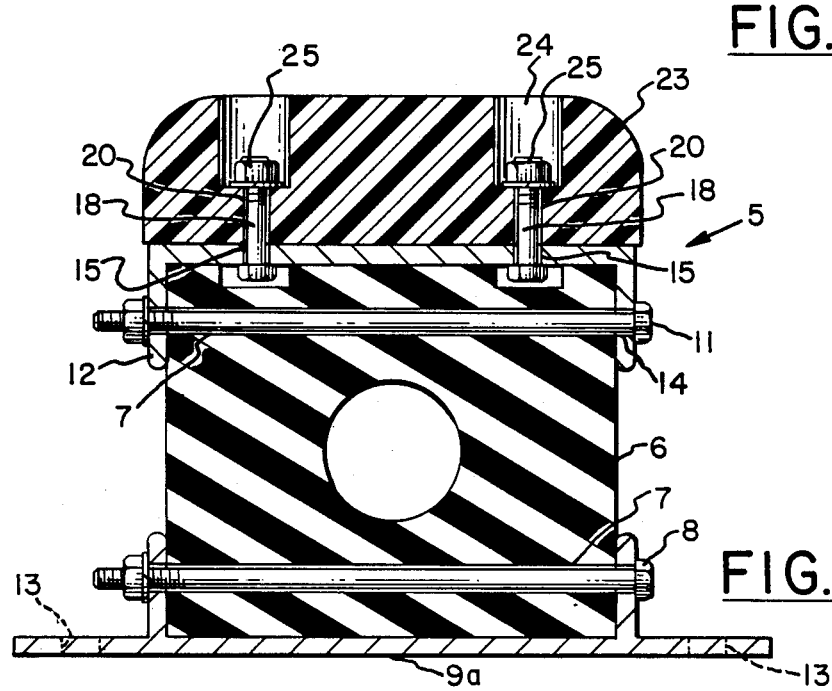
FIG. 2 is a cross-sectional view through FIG. 1 along 2—2.
Figure 3:
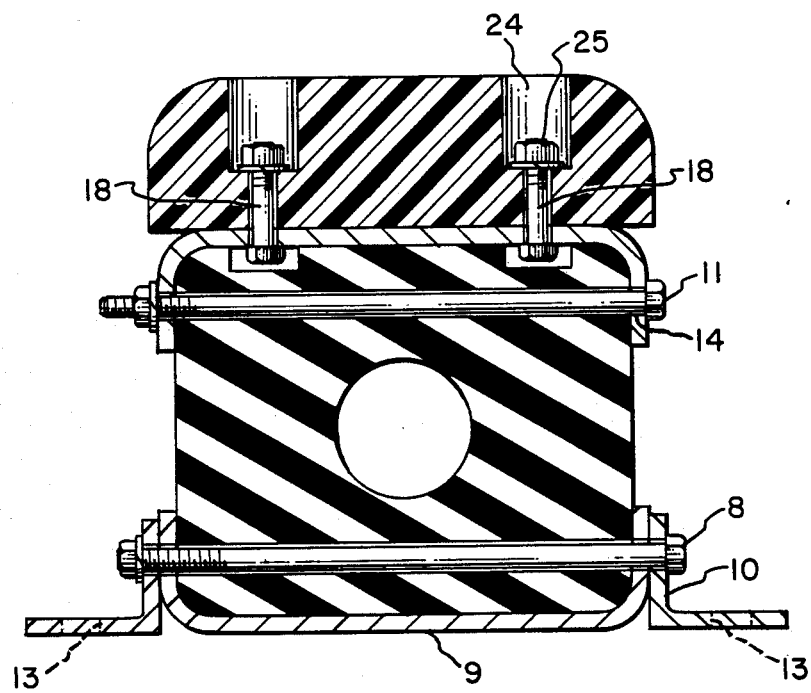
FIG. 3 is a cross-sectional view of FIG. 1 along 2—2 showing another embodiment of the fender assembly.

Referring specifically to FIG. 1, numeral 5 designates the assembly wherein numeral 6 designates a generally rectangular or polygon shaped compounded rubber member having bolts holes 7 extending therethrough to receive bolts 8 and 11. The lower bolts 8 best seen in FIGS. 2 and 3 are used to hold the lower metal member 9a in FIG. 2 and the C-shaped member 9 and the dock attachment flanges 10 in FIG. 3. The upper bolts 11 are used to attach the upper C-shaped member 12 over the top of rubber member 6.

The lower C-shaped member 9 can have holes (not shown), for receiving bolts to bolt the member to the wing wall, but generally it is preferred to attach the assembly by means of bolts (not shown) in holes 13 in the dock attachment flange 10 or a plate.

The upper C-shaped member has holes 14 and 15 therein. The hole 14 receives a bolt 11 to hold the rubber member 6 in the position best seen in FIGS. 2 and 3. Holes 15 receive bolts 18 which pass through holes 20 in the slip member 23 and thus holds slip member 23 in operative assembly with the rubber member 6 and the dock. The slip member 23 has recessed openings 24 around top or outboard side thereof to permit bolts 18 to be recessed from the surface sufficiently that the polyethylene compression under impact will not cause the heads 25 of bolts 18 to protrude and gouge the sides of the vessel.

The slip member 23 is made of an ultra-high molecular weight polyethylene preferably of 3.5 to 6 million molecular weight and a preferred density of at least 0.94 where the molecular weight is at least about 3.5 million. It is preferred that the polyethylene contain a few parts by weight, usually 5 to 10 or more of a carbon black and an ultraviolet additive to protect the polyethylene from the sun.

Reference to FIG. 2 or 3 discloses that the square rubber member 6 was extruded and cured with a hole 26 longitudinally therein of about 7.5 centimeters or more in diameter to reduce the weight of rubber and also to allow it to be more readily compressed to absorb the impact and sliding forces. Also, rubber member 6 can be circular or tubular as well as the hole 26 may be even rectangular or an ellipse.

Generally, the cured rubber used in the rubber member has an ultimate tensile strength of at least 2000 psi, a durometer hardness of about 65–75 shore A scale and an elongation of about 300%. Any of the rubbers such as polybutadiene, polyisoprene, butadiene/styrene, EPDM and natural rubber or related rubbers suitably compounded with the well known carbon black fillers, sulfur curatives to yield a cured compound having a tensile of abut 2000 psi or more, a hardness or durometer scale of about 65 to 75 and an elongation of about 250 to 450 perform satisfactory.

Any of the well known ultraviolet inhibitors may be used in about 1 to 10 parts per 100 of polyethylene, but the substituted benzo-triazoles are preferred where the substitulants are alkyl, cyclo alkyl or aryl. These materials are readily available and the commercial literature practically lists all those suitable for use with polyvinyl chloride and they are suitable for use with polyethylene.

What is claimed is:

1. A bumper assembly for use on a dock comprising an impact surface composed of a ultraviolet resistant ultra-high molecular weight polyethylene member attached to an upper member, that rests over said rubber member said upper member being attached to a rubber member, said rubber member being attached to a dock by a lower member to permit a force imparted to the polyethylene member to be transmitted to the dock through the rubber member.

2. The bumper of claim 1 wherein the ultra-high molecular weight polyethylene has a molecular weight of about 3.5 to about 6 million.

3. The bumper assembly of claim 1 wherein the upper member is metallic.

4. The bumper assembly of claim 3 wherein the upper member has essentially a C-shape.

5. The bumper assembly of claim 1 wherein the lower member has a shape to extend up to be bolted to the lower portion of the rubber member.

* * * * *